US006345501B1

(12) United States Patent
McKay et al.

(10) Patent No.: US 6,345,501 B1
(45) Date of Patent: Feb. 12, 2002

(54) HYDRAULIC MOTOR

(75) Inventors: Richard John McKay, Brewood; Tony Jones, Northfield, both of (GB)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/405,415

(22) Filed: Sep. 24, 1999

(30) Foreign Application Priority Data

Sep. 25, 1998 (GB) ............................................ 9820775

(51) Int. Cl.[7] ............................ F16D 31/02; F01B 1/00
(52) U.S. Cl. ............................ 60/468; 60/494; 91/489
(58) Field of Search .................... 60/468, 494; 91/486, 91/489

(56) References Cited

U.S. PATENT DOCUMENTS 3,785,157 A * 1/1974 Kittle et al. ............. 60/494 X
4,586,332 A * 5/1986 Schexnayder ................ 60/468
4,653,271 A * 3/1987 Reeves et al. ................ 60/494
4,694,649 A * 9/1987 Howeth ....................... 60/468
4,782,662 A * 11/1988 Reeves et al. ............ 60/494 X
5,410,842 A * 5/1995 Watson ..................... 60/494 X

* cited by examiner

*Primary Examiner*—John E. Ryznic
(74) *Attorney, Agent, or Firm*—Andrus, Sceales, Starke, Sawall

(57) ABSTRACT

A hydraulic motor arrangement including a hydraulic motor having an inlet port arranged to receive a driving fluid, and an outlet port whereby fluid can exhaust from the motor, the arrangement incorporating a by-pass line interconnecting the inlet and the outlet ports, a non-return valve being located within the by-pass line and being arranged to permit fluid flow from the outlet port to the inlet port but to substantially prevent fluid flow in the reverse direction.

7 Claims, 1 Drawing Sheet

HYDRAULIC MOTOR

This invention relates to a hydraulic motor, and in particular to a hydraulic motor in which the power consumption is reduced when the motor is operating at low load, zero load and/or aiding load conditions.

Hydraulic motors are used in a wide variety of applications. One application is in the control of movement of aircraft flaps and slats. In order to minimise the power consumption of such motors in applications where the load on the motor is variable, it is known to use variable displacement motors. Such motors are relatively expensive, and it is an object of the invention to provide a hydraulic motor which permits a reduction in power consumption and which is of relatively simple form.

According to the present invention there is provided a hydraulic motor arrangement comprising a hydraulic motor arranged to receive a driving fluid through an inlet port, the motor including an outlet port whereby fluid can escape from the motor, and a by-pass line interconnecting the inlet and the outlet ports, a non-return valve being located within the by-pass line and arranged to permit fluid flow from the outlet port to the inlet port but to substantially prevent fluid flow in the reverse direction.

In use, where the motor is operating against a significant load, the fluid pressure at the inlet port will be higher than that at the outlet port, thus the by-pass valve will be closed and the motor will operate in the conventional manner. If the applied load is removed, and instead an aiding or assisting load is applied which drives the hydraulic motor, then the fluid pressure at the outlet port will rise above that at the inlet port, and the non-return valve will open permitting fluid to recirculate through the by-pass line to the inlet port. It will be appreciated that, in such circumstances, the net power consumption of the motor is reduced as the quantity of fluid drawn from the fluid supply line to the return line is reduced.

Where the hydraulic motor is of the bi-directional type, appropriate control valves are conveniently provided to control which of the ports of the motor is used as the inlet port and which of the ports of the motor is used as the outlet port at any given instant, and to maintain the appropriate direction of the non-return valve relative to the motor ports.

A restriction is conveniently provided in the by-pass line.

The restriction may be a variable restriction. A pump may be provided in parallel with the variable restriction, the pump being driven at a speed associated with the speed of operation of the motor and arranged to return fluid towards the inlet port of the motor. The restriction is conveniently controlled in such a manner as to be responsive to the load applied to the motor. In such an arrangement, the restriction is conveniently arranged to provide a high restriction to flow under low opposing load conditions, the pump being arranged to return a significant proportion of the fluid passing through the motor back to the inlet port. As a result, the efficiency of the hydraulic motor arrangement is improved under low load conditions.

The invention will further be described, by way of example, with reference to the accompanying drawings, in which.

Figure 1:
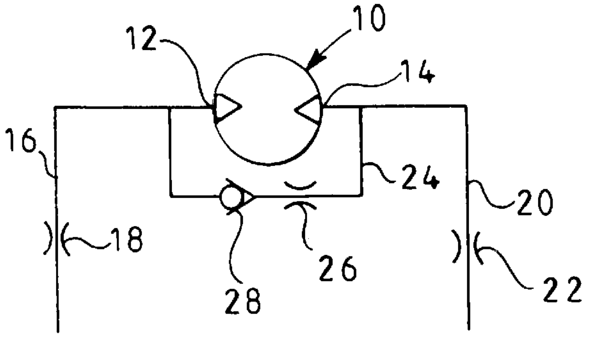
FIG. 1 is a diagram illustrating a hydraulic motor in accordance with a first embodiment.

The hydraulic motor arrangement illustrated in FIG. 1 comprises a fixed displacement hydraulic motor 10 having an inlet port 12 and an outlet port 14. The inlet port 12 communicates through a supply passage 16 including a restriction 18 with a source of hydraulic fluid under pressure (not shown). The outlet port 14 communicates through a return passage 20 including a restriction 22 with an appropriate reservoir (not shown) from which the hydraulic fluid may be drawn by an appropriate pump to supply the hydraulic fluid under pressure to the passage 16 at a subsequent point in the operation of the hydraulic motor arrangement.

A by-pass line or passage 24 is connected between the outlet port 14 and the inlet port 12, the by-pass passage 24 including a restriction 26 and a non-return valve 28 orientated to permit fluid to flow from the outlet port 14 to the inlet port 12, but to substantially prevent flow of fluid through the by-pass passage 24 in the reverse direction.

The hydraulic motor includes an output shaft (not shown in the FIG. 1 arrangement) which, in use, is connected to a load to be moved. Where the hydraulic motor arrangement is used in an aircraft application, the output shaft of the hydraulic motor may be connected, through appropriate gearing, with an aircraft flap or slat which is to be moved.

In use, when the hydraulic motor arrangement is to be actuated to cause movement of the output shaft, hydraulic fluid under pressure is applied through the passage 16 to the inlet port 12. The supply of fluid under pressure to the hydraulic motor causes the motor to operate, rotating the output shaft, fluid escaping from the motor 10 through the outlet port 14 from where the fluid is returned to the fluid reservoir through the passage 20. During such normal operation, as the fluid pressure at the inlet port 12 is higher than that at the outlet port 14, the non-return valve 28 is held in its closed position, thus fluid is unable to flow along the by-pass passage 24.

In circumstances in which an assisting or aiding load is applied to the output shaft of the hydraulic motor 10, the assisting load causes operation of the motor 10, drawing fluid from the inlet port 12 and supplying fluid to the outlet port. In such circumstances, the presence of the restrictions 18, 22 in the inlet and outlet passages 16, 20 result in the fluid pressure at the outlet port 14 being greater than that at the inlet port 12. As a result, fluid is able to flow along the by-pass passage 24, through the restriction 26 and non-return valve 28 to the inlet port 12. Such a flow of fluid is advantageous in that the net quantity of fluid drawn from the passage 16 by the hydraulic motor arrangement in circumstances in which such an assisting load is applied is reduced, thus the efficiency of the hydraulic motor arrangement is improved.

The restriction 26 may be replaced, if desired, by a flow limiting valve.

Figure 2:
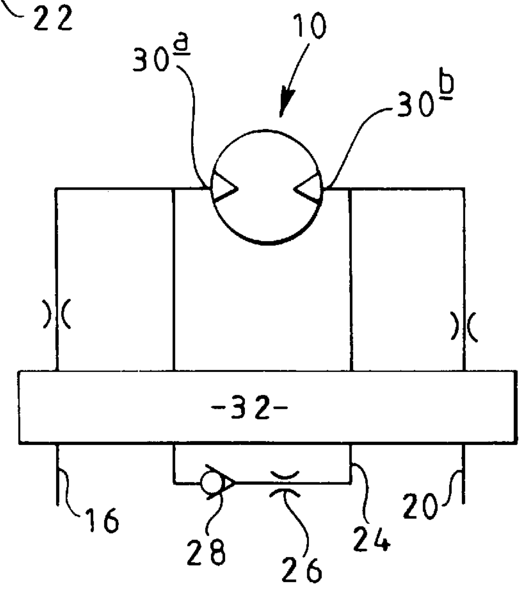
FIG. 2 is a diagram illustrating a motor in accordance with a second embodiment.

The arrangement illustrated in FIG. 2 is similar to that of FIG. 1, but includes a fixed displacement hydraulic motor 10 which is capable of operating in either direction. The hydraulic motor 10 includes first and second ports *30a*, *30b* which communicate through an appropriate control valve arrangement 32 with the supply and return passages 16, 20 and with the by-pass passage 24 such that in one mode of operation, the supply passage 16 supplies fluid to the port *30a* the port *30b* communicating with the return passage 20, and flow is permitted along the by-pass passage 24 from the port *30b* to the port *30a*, and in a second mode of operation, the supply passage 16 communicates with the port *30b*, the return passage 20 communicating with the port *30a*, the by-pass passage 24 permitting fluid flow from the port *30a* to the port *30b*, but substantially preventing fluid flow in the reverse direction. Such an arrangement is advantageous in that the hydraulic motor can be positively driven in both directions, and aiding or assisting loads in either direction can be used to reduce the net quantity of fluid drawn by the hydraulic motor arrangement from the source of fluid under pressure.

In effect, the embodiment of FIG. 2 uses the valve arrangement 32 to control which of the ports 30*a,* 30*b* acts as the inlet port and which of the ports 30*a,* 30*b* acts as the outlet port at any given instant.

If desired, the control valve 32 may be arranged only to control communication between the ports 30*a,* 30*b* and the passages 16, 20, the control valve 32 not communicating with the by-pass passage 24. In such an arrangement, an appropriate pressure sensitive logic arrangement may be used in the by-pass passage 24 to control the operation of valves, thereby controlling the direction of fluid flow through the passage 24.

Figure 3:
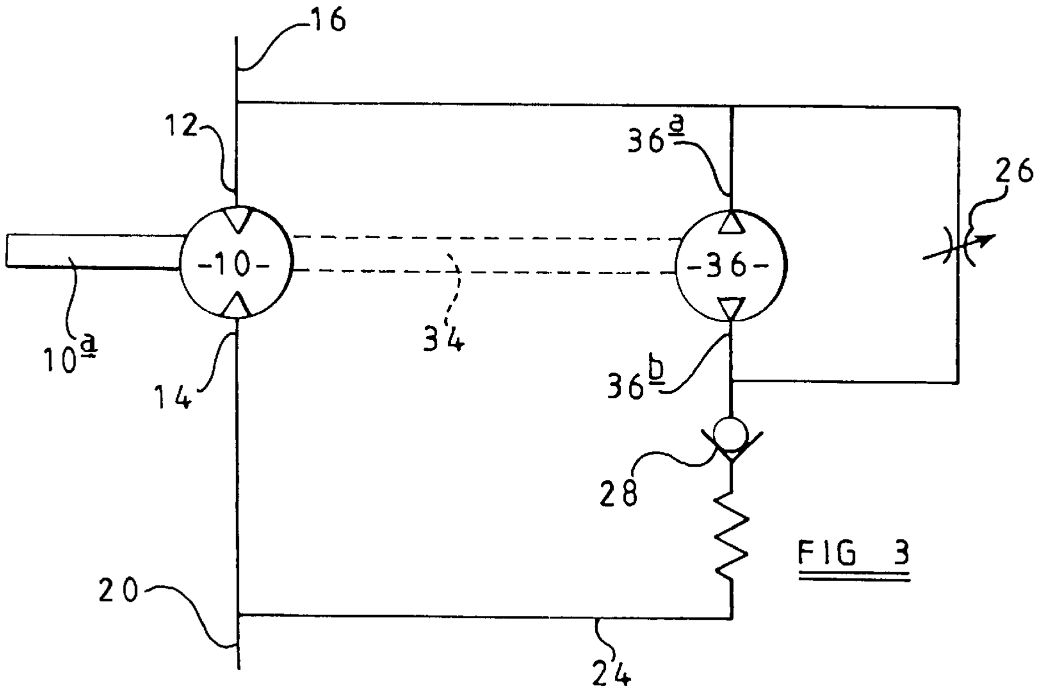
FIG. 3 is a diagram illustrating a motor in accordance with a third embodiment of the invention.

The arrangement illustrated in FIG. 3 is designed to improve efficiency under low opposing load conditions and differs from the arrangements of FIGS. 1 and 2 in that the motor 10 is connected through an appropriate drive arrangement 34 with a fixed displacement pump 36 which is located in parallel with the restriction 26 in the by-pass passage 24. The restriction 26 takes the form of a variable flow restriction and is arranged to be controlled in such a manner as to be responsive to the magnitude of the load applied to the hydraulic motor 10. The pump 36 is driven by the drive arrangement 34 in such a manner as to return fluid towards the inlet port 12 of the motor 10, the pump 36 being driven at a speed associated with the operating speed of the motor 10.

In use, if the motor 10 is to be used to drive a relatively high load applied to the output shaft 10*a* of the motor 10, then the restriction to the flow of fluid provided by the restriction 26 is controlled in such a manner as to be low. The application of fluid under pressure to the passage 16 and inlet port 12 drives the motor 10 to cause rotation of the output shaft 10*a,* fluid being returned through the outlet port 14 and return passage 20 to the fluid reservoir. As the restrictor 26 forms only a low restriction to fluid flow during such circumstances, the operation of the pump 36 during such operation of the hydraulic motor arrangement has little effect, any pressurization of fluid at the outlet 36*a* of the pump 36 being of small magnitude as fluid is able to return to the inlet 36*b* of the pump 36 through the restriction 26.

When the hydraulic motor arrangement is used in circumstances in which there is a reduced load on the output shaft 10*a* of the motor 10, the restriction 26 is operated to form a large restriction to fluid flow. This causes a reduced pressure at the inlet 36*b* and thereby causes the one-way valve 28 to open. As a result, the pump 36 returns the fluid towards the inlet port 12 of the motor 10. It will be appreciated that, in such circumstances, a significant quantity of fluid is returned by the pump 36 towards the inlet port of the motor 10, thus the efficiency of the system is improved.

What is claimed is:

1. A hydraulic motor arrangement including a hydraulic motor having a rotary output connected to a load, an inlet line connected to an inlet port arranged to receive a driving fluid, and an outlet line connected to an outlet port whereby fluid can exhaust from the motor, the arrangement further including a by-pass line interconnecting the inlet and the outlet ports, a first flow restrictor in said inlet line upstream of said inlet port, a second flow restrictor in said outlet line downstream of said outlet port, and a non-return valve located within the by-pass line and arranged to permit fluid flow from the outlet port to the inlet port but substantially to prevent fluid flow in the reverse direction, whereby, should the load operate to assist the rotation of the output of the motor, then the pressure at the outlet port will exceed the pressure at the inlet port, thereby opening said non-return valve and permitting flow through said by-pass line from said outlet port to said inlet port.

2. An arrangement as claimed in claim 1, wherein said hydraulic motor is of the bi-directional type, and there is provided appropriate control valve means to control which of the ports of the motor is used as the inlet port and which of the ports of the motor is used as the outlet port at any given instant.

3. An arrangement as claimed in claim 2, wherein said control valve means also maintains the appropriate direction of the non-return valve relative to the motor ports.

4. An arrangement as claimed in claim 1, wherein a restriction is provided in the by-pass line.

5. An arrangement as claimed in claim 4, wherein said restriction is a variable restriction.

6. An arrangement as claimed in claim 5, wherein a pump is connected in parallel with said variable restriction, the pump being driven at a speed associated with the speed of operation of the motor and is arranged to return fluid towards the inlet port of the motor.

7. An arrangement as claimed in claim 6, wherein said variable restriction is controlled in such a manner as to be responsive to the load applied to the motor to provide a high restriction to flow under low opposing load conditions, such that the pump returns a significant proportion of the fluid passing through the motor back to the motor inlet port.

* * * * *